J. D. JONES.
VALVE.
APPLICATION FILED FEB. 14, 1913.
1,113,789.
Patented Oct. 13, 1914.
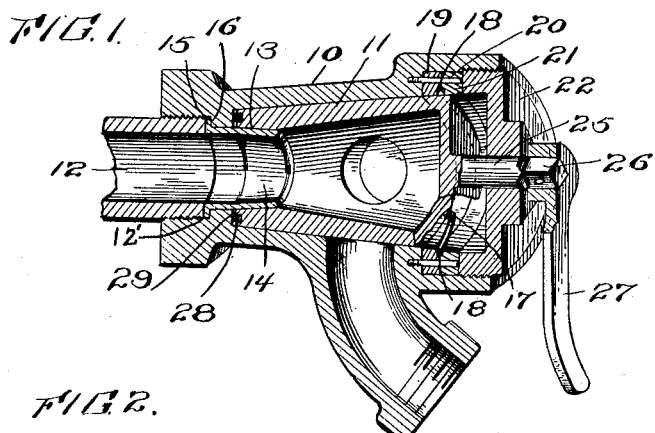
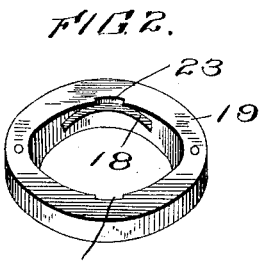
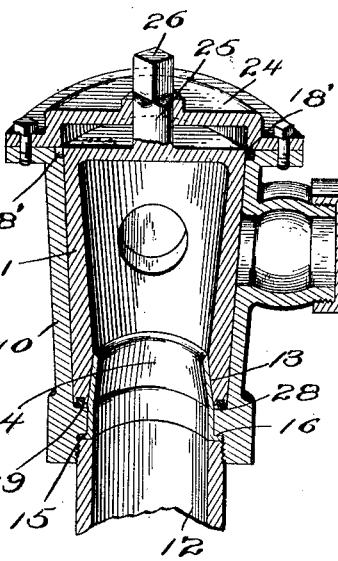
Inventor
John D. Jones,
Witnesses

UNITED STATES PATENT OFFICE.

JOHN D. JONES, OF WALLA WALLA, WASHINGTON.

VALVE.

1,113,789. Specification of Letters Patent. Patented Oct. 13, 1914.

Application filed February 14, 1913. Serial No. 748,451.

*To all whom it may concern:*

Be it known that I, JOHN D. JONES, a citizen of the United States, residing at Walla Walla, in the county of Walla Walla and State of Washington, have invented certain new and useful Improvements in Valves; and I do hereby declare the following to be a full, clear, and exact description of the invention, such as will enable others skilled in the art to which it appertains to make and use the same.

This invention relates to valves and has for an object to provide a valve having improved means for seating the valve within the housing when the valve is both at open and closed position.

A further object of the invention is to provide a housing internally tapered with a valve externally tapered complementary to the housing and with improved means for moving the valve longitudinally within the housing when it is rotated and improved means for producing a tight fit when the valve is seated either at open or closed position.

With these and other objects in view the invention comprises certain novel constructions, combinations and arangement of parts as will be hereinafter more fully described and claimed.

In the drawings: Figure 1 is a diametrical sectional view of the improved valve shown arranged as an air cock for air-brake systems or the like. Fig. 2 is a perspective view of the cam ring used in the valve shown at Fig. 1. Fig. 3 is a diametrical sectional view of a slightly different embodiment of the valve. Fig. 4 is a top plan view of the valve member removed from the housing.

Like characters of reference designate corresponding parts throughout the several views.

The improved valve shown in the accompanying drawings comprises a housing 10 tapered internally and a valve member 11 externally complementarily tapered and rotatably mounted within the housing 10. Both the housing 10 and the valve 11 are open at their smaller ends for communication with a pipe 12 which may be connected therewith in any usual well known manner. The inner open end of the valve 11 is also reversely tapered as indicated at 13 and a conical sleeve 14 is inserted into the housing and into position for engagement with such tapered end of the valve as shown at Figs. 1 and 3. The sleeve 14 may be held in position in any usual well known manner as by being shrunk in, pressed in or the like, all of which would be comprehended in Figs. 1 and 3. A flange 15 is also preferably provided which engages against a shoulder 16 of the housing, and the sleeve is retained in position by screwing the pipe 12 into place as shown at 12'.

The valve 11 is provided with diametrically extending lugs 17 which for the convenience of construction are preferably formed at the upper or larger end of the valve member, and said lugs travel in cam grooves to move the valve longitudinally when it is rotated. As shown at Fig. 1 the grooves 18 are formed in a ring 19 which is set into the housing 10 and held in position against rotation by dowels 20 and a follower ring 21. This follower ring 21 is in turn held in position by the cap or plug 22. As shown at Fig. 3 the cam grooves 18' are formed directly in the housing and in either case they are open at the top as indicated at 23 in Fig. 2 and are closed by the superposed member, the member at Fig. 3 being the cap 24. The valve member 11 is provided with a stem 25 which extends through the closure as for instance the plug 22 and cap 24 and is provided with a squared end 26 for receiving an operating implement as the handle 27 shown at Fig. 1. It will be noted especially from Fig. 2 that the cam grooves have their opposite ends lower than the center and equally depressed. By such arrangement it will be apparent that when the valve member 11 is rotated the lugs 17 will travel in such grooves and at opposite extremes of the grooves the valve member 11 will be forced downwardly or toward its smaller end to properly seat the latter betwen the housing 10 and the sleeve 14. At such lower end the valve is also provided with a gasket 28 which engages a shoulder 29 within the housing and forms an auxiliary means, taken in conjunction with the taper of the valve housing and the sleeve, for closing or forming an air-tight joint between the valve member and the housing. By the arrangement described it will be apparent that when the valve is rotated either to open or closed position a longitudinal as well as a rotary movement is imparted thereto which by reason of the taper serves to first loosen the valve in the housing and permit its free rotation while at the other extreme of its movement it is again firmly seated as above described so that whether open or closed the valve is firmly seated in the housing, the loosening occurring only during the movement of the valve from opening to closing or the reverse.

I claim:—

1. In a valve, a housing internally tapered and provided with an annular inwardly extending shoulder at its smaller end, a tubular valve member externally tapered complementary to the housing and internally tapered reversely thereto, a tapered sleeve inserted in the smaller end of the housing and positioned to engage the internal taper of the valve, and means to move the valve longitudinally when rotated.

2. In a valve, a housing internally tapered and open at its smaller end, a tubular valve member externally tapered complementary to the internal taper of the housing and internally tapered at its smaller end reversely to its external taper, a tapered tubular sleeve inserted in the smaller end of the housing and projecting into and fitting the internal taper of the valve, and means to move the valve member longitudinally to simultaneously vary its contact with the housing and sleeve.

3. In a valve, a housing internally tapered and provided with an outwardly facing annular shoulder at its smaller end, a valve member externally tapered complementary to the internal taper of the housing and internally tapered reversely to the external taper, a sleeve inserted in the smaller end of the housing and in position to engage the internal taper of the valve member, an annular gasket carried at the smaller end of the valve and positioned to engage the annular shoulder, and means to move the valve longitudinally to vary the contact of the valve with the tapered bore of the housing and the tapered bore of the sleeve and the contact of the gasket with the shoulder.

4. In a valve, a housing internally tapered, a valve externally tapered complementary to the taper of the housing, a cam member removably inserted in the housing and provided with a cam groove, the extremes of which are equally spaced from the ends of the housing and the middle of which is spaced from the smaller end of the housing farther than the extremes and opens through one side of said member, a lug on the valve member riding in the groove, means to hold the cam member against movement and close the open portion of its groove, and means to rotate the valve member.

5. In a valve, a housing internally tapered, a valve member externally tapered complementary to the taper of the housing, a cam ring inserted in the larger end of the housing and provided with a cam groove opening at its highest point through one side of the ring, a follower ring inserted in the housing against said cam ring and closing the open portion of its groove, a lug formed upon the valve member riding in said groove said cam and lug being adapted to move the valve member longitudinally as the valve is rotated, and a closure for the housing bearing upon the follower ring.

In testimony whereof I affix my signature in presence of two witnesses.

JOHN D. JONES.

Witnesses:
GEORGE H. MACDONALD,
L. L. MORRILL.

---

Copies of this patent may be obtained for five cents each, by addressing the "Commissioner of Patents, Washington, D. C."